US012525081B2

(12) United States Patent
Chen

(10) Patent No.: US 12,525,081 B2
(45) Date of Patent: Jan. 13, 2026

(54) NARROW-TYPE DOOR-LOCK DRIVING DEVICE WITH ELECTRONICALLY CONTROLLED SWITCHING STATUS

(71) Applicant: Shanghai Ming Wei Hardware Co., Ltd., Shanghai (CN)

(72) Inventor: Jung-Chung Chen, Shanghai (CN)

(73) Assignee: Shanghai Ming Wei Hardware Co., Ltd., Shanghai (CN)

( * ) Notice: Subject to any disclaimer, the term of this patent is extended or adjusted under 35 U.S.C. 154(b) by 47 days.

(21) Appl. No.: 18/640,994

(22) Filed: Apr. 19, 2024

(65) Prior Publication Data

US 2025/0218239 A1 Jul. 3, 2025

(30) Foreign Application Priority Data

Jan. 3, 2024 (TW) ................................ 113200078

(51) Int. Cl.
*G07C 9/00* (2020.01)

(52) U.S. Cl.
CPC ................................ *G07C 9/00944* (2013.01)

(58) Field of Classification Search
CPC ... G07C 9/00944; G07C 9/00174; E05B 9/04; E05B 47/0002; E05B 47/0003
USPC ........................................................... 70/277
See application file for complete search history.

(56) References Cited

U.S. PATENT DOCUMENTS

| | | | | |
|---|---|---|---|---|
| 11,268,300 | B2 * | 3/2022 | Langenberg | E05B 47/0615 |
| 2017/0243425 | A1 * | 8/2017 | Meganck | G07C 9/00174 |
| 2018/0066451 | A1 * | 3/2018 | Shen | G07C 9/00174 |
| 2020/0011088 | A1 * | 1/2020 | Harris | G07C 9/00309 |
| 2020/0265662 | A1 * | 8/2020 | Maiga | G07C 9/00174 |
| 2021/0035394 | A1 * | 2/2021 | Anderson | E05D 11/0081 |
| 2023/0072967 | A1 * | 3/2023 | Lv | G07C 9/00817 |
| 2023/0101669 | A1 * | 3/2023 | Banse | B62H 5/001 70/223 |
| 2023/0203843 | A1 * | 6/2023 | Pukari | G07C 9/00174 70/276 |

* cited by examiner

*Primary Examiner* — Nathan Cumar
(74) *Attorney, Agent, or Firm* — Muncy, Geissler, Olds & Lowe, P.C.

(57) ABSTRACT

A narrow-type door-lock driving device with electronically controlled switching status includes a base, a status switching mechanism, an electromagnetic traction mechanism, a handle and a lock core driving mechanism. The status switching mechanism is disposed at the base, including a lever and a stopper. The electromagnetic traction mechanism connects the lever, for dragging the lever to move the stopper from a stop position to an avoidance position after receiving a first control signal sent by a control device. The lock core driving mechanism connects the handle; when the stopper is in the stop position, it's blocked by the stopper and forbidden to be driven by the handle, a deadbolt kept snapping into a locking groove to maintain forbidden opening; when the stopper is in the avoidance position, it's driven by the handle to allow driving a lock core component, thereby allowing the deadbolt to snap out of the locking groove.

9 Claims, 9 Drawing Sheets

NARROW-TYPE DOOR-LOCK DRIVING DEVICE WITH ELECTRONICALLY CONTROLLED SWITCHING STATUS

This application claims the benefit of Taiwan Patent Application Serial No. 113200078, filed on Jan. 3, 2024, the subject matter of which is incorporated herein by reference.

BACKGROUND OF THE INVENTION

(1) Field of the Invention

The invention relates to a narrow-type door-lock driving device, and more particularly to a narrow-type door-lock driving device with electronically controlled switching status that uses electronically control to switch between an unlocking status and a locking status.

(2) Description of the Prior Art

In order to control and manage people in a specific place, access control is usually set up at the entrance and exit doors. Only authorized people can open and enter the specific place to ensure the safety of the controlled area.

A sectional door is a door that uses a metal as the door-frame (aluminum or stainless steel in most cases) and embedded glass panels. Since sectional doors are stronger than traditional wooden doors and are not easily damaged and have better anti-theft properties, in recent years, more and more people have chosen sectional doors for access control.

However, since there is a glass panel embedded in the middle of the sectional door, the door-lock driving device cannot be installed through the glass panel but can only be installed through the metal door-frame of the sectional door. In the meanwhile, because the width of the metal door-frame of the current sectional door has its own specifications after decades of development and is generally narrow (about 50 mm wide), the traditional door-lock driving device may be wider than the metal door-frame because its body width is wider than the metal door-frame. It cannot be directly installed on the sectional door.

In order to assemble the door-lock driving device into the narrow-type door-frame of the sectional door, the door-lock driving device needs to reduce its body width. This will cause the space inside the door-lock driving device for mechanism to become compact, making it impossible to directly use the traditional door-lock driving device.

Additionally, outer door-locks used for access control are categorized into two types: normally-closed door-locks and normally-open door-locks according to the needs of use. The above difference lies in whether the user can press the handle to open it under predetermined conditions.

In terms of the working principle of a normally-closed door-lock, the access control system is in a status of prohibiting the door from opening and prohibiting users from opening it, regardless of whether the power is cut off or turned on. Only when the user sends an unlocking signal to the normally-closed door-lock through an access control device (such as an access control card machine or access control host), the normally-closed door-lock will switch to the status of allowing the door to open and allows the user to unlock. Since the access control system prohibits users from opening the door when the power is on (such as normal power supplying of a power system) or cut off (such as abnormal power supplying or power outage of a power system), it is usually installed on the outdoor side of the escape door leading to the outdoors to ensure that no matter how the power supply status of the access control system changes, users can be truly prohibited from opening from the outdoor side to enter into the indoor side so that it can maintain the safety of the access control area.

In terms of the working principle of a normally-open door-lock, when the access control system cuts off the power, it is in the door-opening allowing status and allows the user to open it. After the power is turned on, it switches to the door-opening prohibition status and the user is prohibited from opening it. When the user sends an unlocking signal to the normally-open door-lock through the access control device (such as an access control card machine or access control host), the normally-open door-lock switches to the status of allowing the door to open and allows the user to unlock. Since the normally-open door-lock synchronously switches to the door-opening prohibited status or the door-opening allowing state according to the switching (conduction) of the power supply status, it is usually installed on the outside of the indoor escape door (The pulling side of the door to open is defined as the outside, and the pushing side of the door to open is defined as the inner side. The inner side of the indoor escape door is usually installed with a flat push type or a push-down type escape door-lock), thereby the switching settings of the power supplying status are used to take into account the access control and escape needs.

In the prior art, it is often necessary to design different internal components for the normally-closed door-lock and the normally-open door-lock, and it is impossible to quickly switch a door-lock to one of the normally-open door-lock or the normally-closed door-lock by replacing some components.

SUMMARY OF THE INVENTION

In view of the fact that, in the prior art, the narrow-type door-frame of the sectional door has a narrow width, and traditional door-lock driving device cannot be directly installed on the narrow-type door-frame of the sectional door. Additionally, in the prior art, it also needs to design different internal mechanisms for the normally-closed door-lock and the normally-open door-lock, and it is impossible to switch a door-lock to one of the normally-open door-lock or the normally-closed door-lock by only replacing some components.

Accordingly, it is an object of the present invention to provide a narrow-type door-lock driving device with electronically controlled switching status, using the relevant components (including a status switching mechanism, an electromagnetic traction mechanism, a lock core driving mechanism and a gear seat return spring) that drive the door-lock to be arranged in the base along a longitude direction. It causes that the power related to driving the door-lock can be transmitted along the longitude direction to form a power transmission chain, which allows the narrow-type door-lock driving device with electronically controlled switching status to be installed on the narrow-type door-frame. Also, it selectively uses one of the electromagnet component and the solenoid valve component to allow the narrow-type door-lock driving device with electronically controlled switching status to quickly switch to one of the normally-open door-lock or the normally-closed door-lock to solve the above problem.

On the basis of the above, the necessary technical means adopted by the present invention to solve the problem of the prior art is to provide a narrow-type door-lock driving device with electronically controlled switching status ("door-lock driving device" hereinafter), disposed at a narrow-type door-frame of a sectional door board, the sectional door board including a locking side neighboring to a locking groove, the narrow-type door-lock driving device being used for driving a lock core component disposed inside the sectional door board to drive a deadbolt to snap into or out of the locking groove. The door-lock driving device includes a base, a status switching mechanism, an electromagnetic traction mechanism, a handle and a lock core driving mechanism.

The base is disposed neighboring to the locking side of the sectional door board. The status switching mechanism is disposed at the base, including a lever and a stopper. The lever is pivoted to the base, and the stopper is moved by the lever to move between a stop position and an avoidance position. The electromagnetic traction mechanism connects with the lever, used for keeping the stopper in the stop position when the lever is in a forbidden opening status, thereby after receiving a first control signal sent by a control device in the forbidden opening status, the electromagnetic traction mechanism drags the lever to move the stopper from the stop position to the avoidance position.

The handle is disposed at the base. The lock core driving mechanism connects with the handle and is driven by the handle, disposed through the base and the sectional door board, wherein when the stopper is in the stop position, the lock core driving mechanism is blocked by the stopper and forbidden to be driven by the handle, the deadbolt kept snapping into the locking groove to maintain a forbidden opening status, wherein when the stopper is in the avoidance position, the lock core driving mechanism is driven by the handle to allow driving the lock core component, thereby allowing the deadbolt to snap out of the locking groove to turn to an allowing opening status. Wherein the electromagnetic traction mechanism makes the lever to keep the stopper in the avoidance position when the lever is in an allowing opening status.

In one embodiment of the present invention, preferably, the handle includes a drive portion and an operation portion. The drive portion is disposed inside the base. The operation portion is extending out of the base from the drive portion, used for a user to operate and exert an unlocking operating force.

The lock core driving mechanism includes a first drive component, a linkage plate and a second drive component. The first drive component is driven by the drive portion. The linkage plate is driven by the first drive component to move along a linkage path, wherein when the stopper is in the stop position, the linkage plate is blocked by the stopper and forbidden to move along the linkage path. The second drive component is driven by the linkage plate to drive the lock core component, wherein when the linkage plate is forbidden to move along the linkage path, the second drive component is forbidden to drive the lock core component. The first drive component includes a handle positioning plate linked to the drive portion.

The linkage plate includes a gear row. The second drive component includes a gear seat and a drive rod. The gear seat is engaged with the gear row, driven by the linkage plate, the gear seat rotating from an initial position to a driving position when the user exerts the unlocking operating force. The drive rod is fixed at the gear seat, used for driving the lock core component. The gear seat includes a disk gear and an adapter sleeve. The disk gear is engaged with the gear row for being driven by the linkage plate. The adapter sleeve is fixed at the disk gear and fitted to secure the drive rod.

The door-lock driving device further includes a gear seat return spring. The gear seat return spring is disposed between the base and the gear seat, rotating from the driving position back to the initial position when the unlocking operating force is removed.

The electromagnetic traction mechanism includes an electromagnet component and an electromagnet return spring. The electromagnet component is disposed at the base, wherein when the lever is in the forbidden opening position, the electromagnet component drives the lever to keep the stopper in the stop position, wherein after receiving the first control signal sent by the control device, the electromagnet component drives the lever to move the stopper from the stop position to the avoidance position. The electromagnet return spring is disposed between the electromagnet component and the lever, used for providing a return force to move the lever to move the stopper back from the avoidance position to the stop position when the forbidden opening status changes to the allowing opening status.

The electromagnetic traction mechanism includes a solenoid valve component and a solenoid valve return spring. The solenoid valve component is disposed at the base, wherein when the lever is in the allowing opening status, the solenoid valve component drives the lever to keep the stopper in the avoidance position, wherein after receiving a second control signal sent by the control device, the solenoid valve component drags the lever to move the stopper from the avoidance position to the stop position. The solenoid valve return spring is disposed between the solenoid valve component and the lever, used for providing a return force to move the lever to move the stopper back from the stop position to the avoidance position when the allowing opening status changes to the forbidden opening status.

As stated above, in the narrow-type door-lock driving device with electronically controlled switching status provided by the present invention, it uses the relevant components (including a status switching mechanism, an electromagnetic traction mechanism, a lock core driving mechanism and a gear seat return spring) that drive the door-lock to be arranged in the base along a longitude direction, so the power related to driving the door-lock can be transmitted along the longitude direction to form a power transmission chain, thereby allowing the narrow-type door-lock driving device with electronically controlled switching status to be installed on the narrow-type door-frame. Also, it selectively uses one of the electromagnet component and the solenoid valve component to allow the narrow-type door-lock driving device with electronically controlled switching status to quickly switch to one of the normally-open door-lock or the normally-closed door-lock.

All these objects are achieved by the narrow-type door-lock driving device with electronically controlled switching status described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a narrow-type door-lock driving device with electronically controlled switching status. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Since the narrow-type door-lock driving device with electronically controlled switching status provided by the present invention can be widely used on different types of sectional doors, there are countless combinations and variations. Here, only the following preferred embodiments will be specifically described for detailed description.

Figure 1:
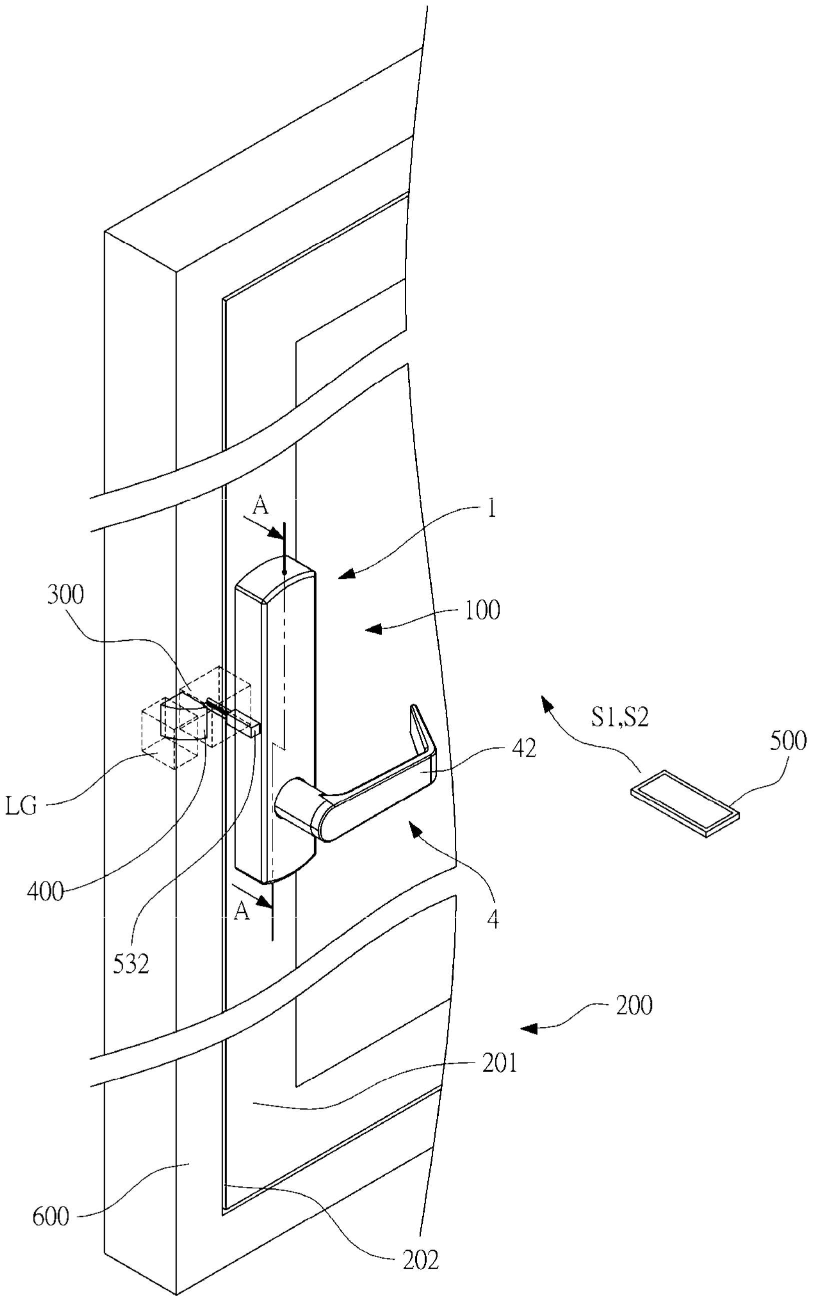
FIG. 1 demonstrates schematically a first embodiment of the narrow-type door-lock driving device with electronically controlled switching status in accordance with the present invention, installed behind a sectional door.
Figure 2:
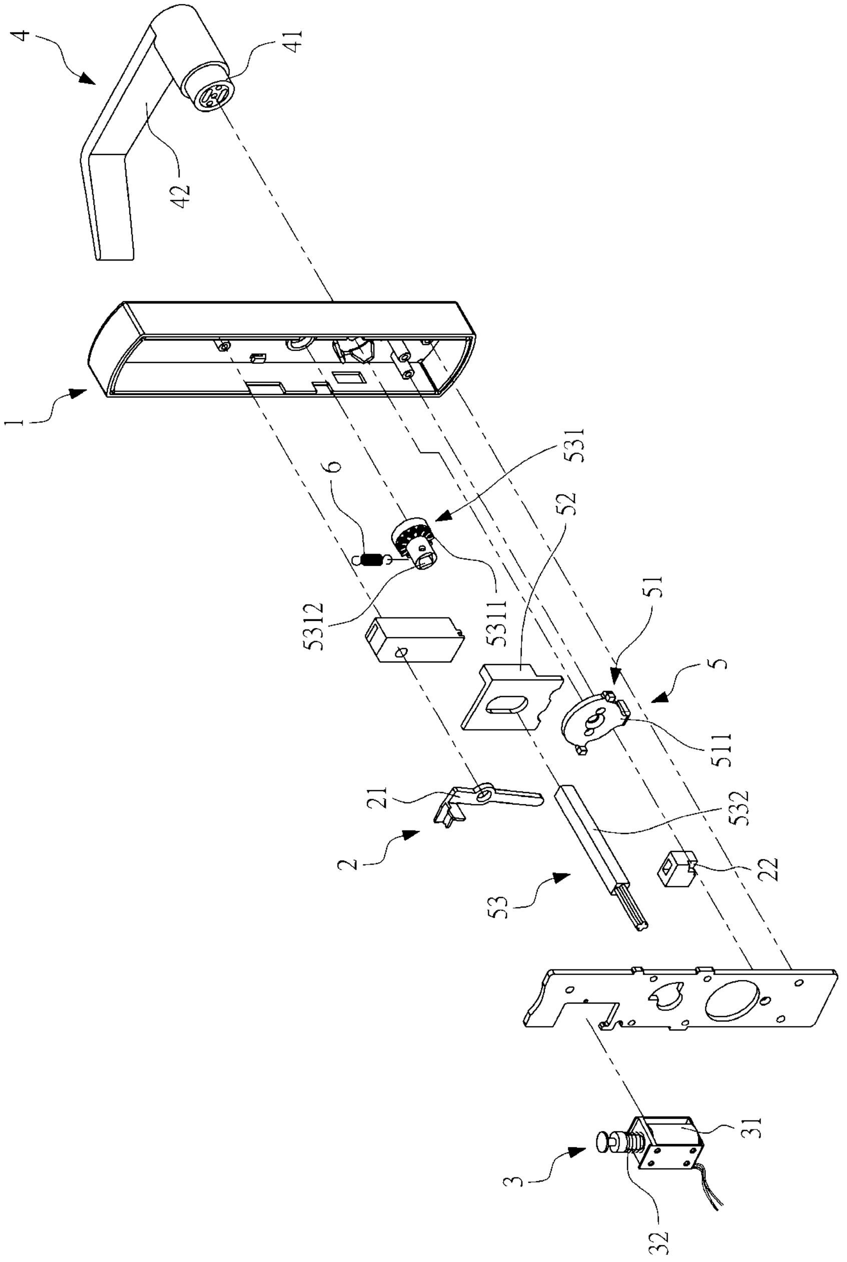
FIG. 2 is an exploded schematic view of the partial components of the narrow-type door-lock driving device with electronically controlled switching status of the first embodiment of the present invention.
Figure 3:
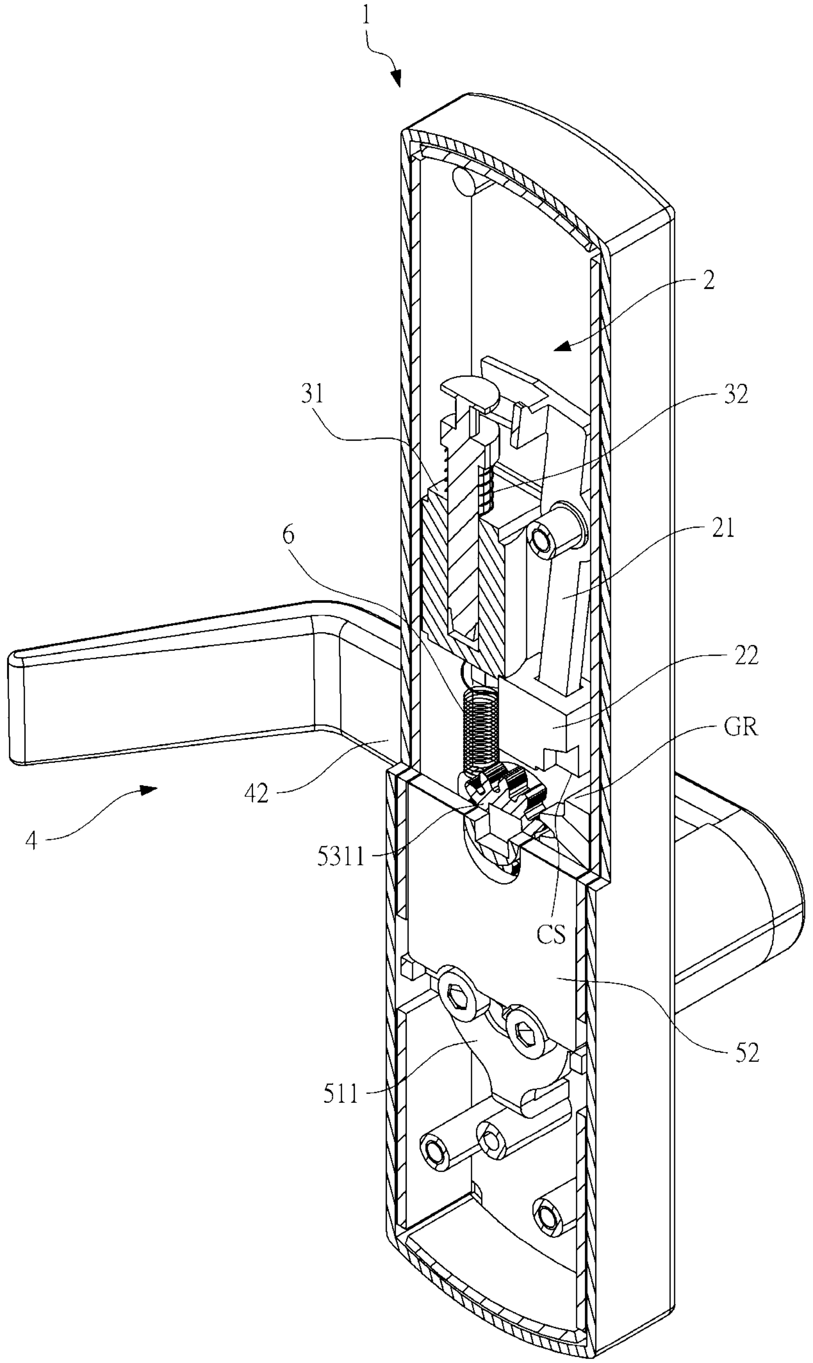
FIG. 3 shows a three-dimensional cross-sectional view of the narrow-type door-lock driving device with electronically controlled switching status along the A-A perspective of the first embodiment of the present invention.
Figure 4:
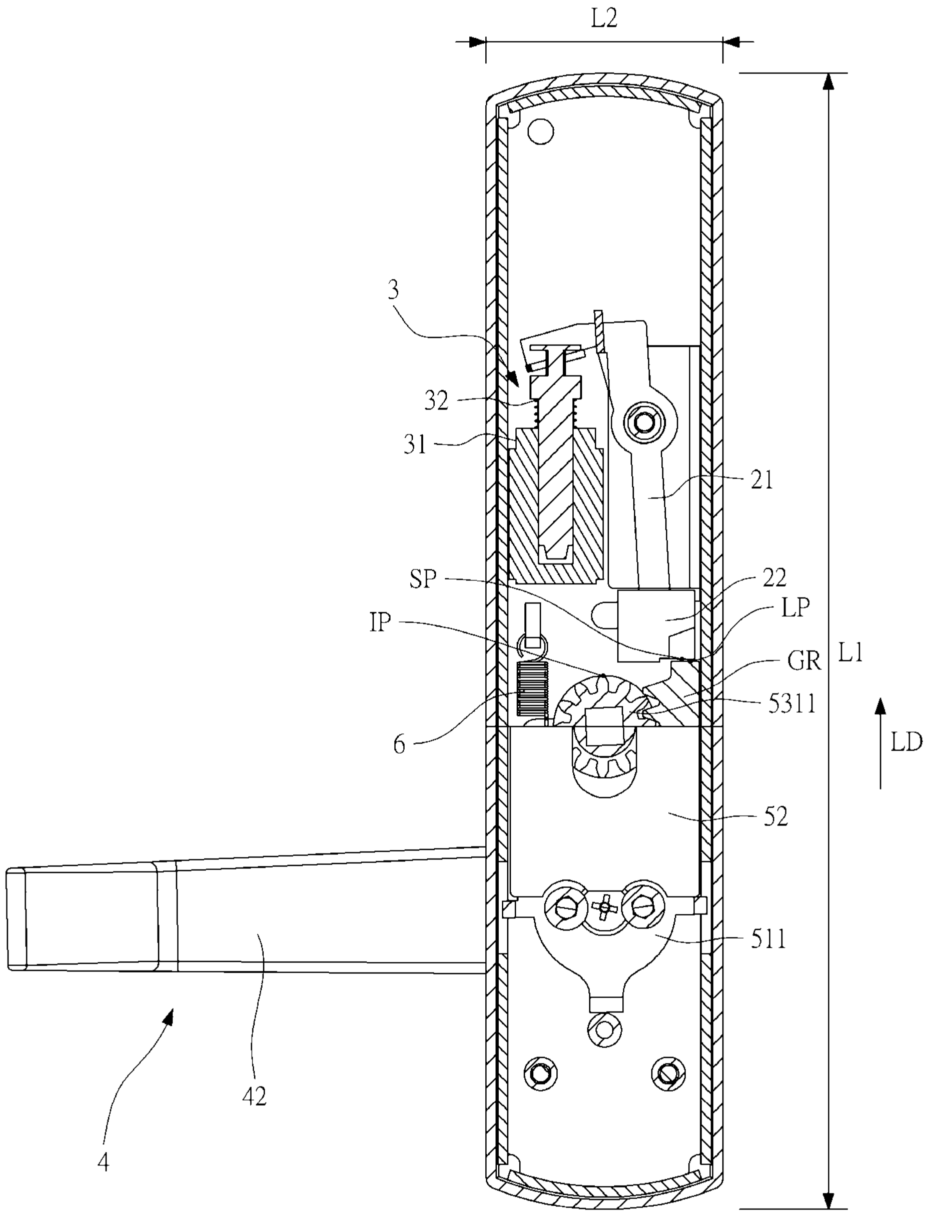
FIG. 4 shows a cross-sectional view of the narrow-type door-lock driving device with electronically controlled switching status along the A-A perspective of the first embodiment of the present invention.

Referring to FIG. 1 to FIG. 4; where FIG. 1 demonstrates schematically a first embodiment of the narrow-type door-lock driving device with electronically controlled switching status in accordance with the present invention, installed behind a sectional door, FIG. 2 is an exploded schematic view of the partial components of the narrow-type door-lock driving device with electronically controlled switching status of the first embodiment of the present invention, FIG. 3 shows a three-dimensional cross-sectional view of the narrow-type door-lock driving device with electronically controlled switching status along the A-A perspective of the first embodiment of the present invention, and FIG. 4 shows a cross-sectional view of the narrow-type door-lock driving device with electronically controlled switching status along the A-A perspective of the first embodiment of the present invention.

As shown from FIG. 1 to FIG. 4, a narrow-type door-lock driving device with electronically controlled switching status ("the door-lock driving device" hereinafter) 100 is disposed at a narrow-type door-frame 201 of a sectional door board 200, the narrow-type door-frame 201 including a lock core component 300, a deadbolt 400 and a locking side 202 neighboring to a locking groove LG. The narrow-type door-frame 201 is made of metal (mostly aluminum or stainless steel), and the width of the narrow-type door-frame 201 has its own specifications after decades of development and is generally narrow (the width is about 5 cm).

The lock core component 300 is used for driving the deadbolt 400 to snap into or out of the locking groove LG. Since the structure and working principle of the lock core component 300 are the same as or similar to those of the prior art and are not an original structure in this invention, they will not be described in detail in this embodiment and their relative positions are only indicated by a dotted block diagram. The locking groove LG can be provided in an outer door-frame 600.

The door-lock driving device 100 includes a base 1, a status switching mechanism 2, an electromagnetic traction mechanism 3, a handle 4, a lock core driving mechanism 5 and a gear seat return spring 6.

Wherein the relevant components (including a status switching mechanism 2, an electromagnetic traction mechanism 3, a lock core driving mechanism 5 and a gear seat return spring 6) that drive the door-lock are arranged in the base 1 along a longitude direction LD, so the power related to driving the door-lock can be transmitted upwards from the handle 4 along the longitude direction LD to form a power transmission chain, thereby allowing the door-lock driving device 100 to be installed on the narrow-type door-frame 201.

The base 1 is disposed neighboring to the locking side 202 of the sectional door board 200, including a side length L1 and a bottom length L2. The side length L1 is usually three times the bottom length L2 to limit the body width of the door-lock driving device 100, thereby allowing the door-lock driving device 100 to be installed on a narrow-type door-frame 201. The status switching mechanism 2 is disposed at the base and includes a lever 21 and a stopper 22. The lever 21 is pivoted to the base 1. The stopper 22 includes a contact surface CS and is moved by the lever 21.

The electromagnetic traction mechanism 3 connects with the lever 21, including an electromagnet component 31 and an electromagnet return spring 32 in the first embodiment. The electromagnet component 31 is disposed at the base 1 and connects with the control device 500 in telecommunication for providing an electromagnetic force to drag the lever 21 to move. In the first embodiment, the electromagnet component 31 is a power-off/on electromagnet component. The power off/on-electromagnet component is usually used in the normally-open door-locks. The normally-open door-locks are allowed to be opened when the access control system cuts off the power supply. The structure and working principle of the power-off/on electromagnet component are not the focus of the present invention, and no further details will be given in this embodiment. The control device 500 can be one of an access control card machine, a mobile phone, a remote control, an operation panel, a remote host, or other devices that can be operated to transmit signals (in the present embodiment, the control device 500 is a mobile phone). After receiving a user's operation, it uses wired transmission or wireless transmission to send a signal to the door-lock driving device 100 to switch the door-lock driving device 100 between an allowing opening status and a forbidden opening status. The electromagnet return spring 32 is disposed between the electromagnet component 31 and the lever 21, used for providing a return force to move the lever 21.

The handle 4 is disposed at the base 1 and includes a drive portion 41 and an operation portion 42. The operation portion 42 extends out of the base 1 from the drive portion 41, used for a user to operate and exert an unlocking operating force.

The lock core driving mechanism 5 connects with the handle 4 and is disposed through the base 1 and the sectional door board 200, including a first drive component 51, a linkage plate 52 and a second drive component 53. The first drive component 51 is driven by the drive portion 41 and includes a handle positioning plate 511 linked with the drive portion 41. The linkage plate 52 is driven by the first drive component 51 and includes a gear row GR.

The second drive component 53 is driven by the linkage plate 52 to drive the lock core component 300 and includes a gear seat 531 and a drive rod 532. The gear seat 531 engages with the gear row GR and includes a disk gear 5311 and an adapter sleeve 5312. The disk gear 5311 engages with the gear row GR for being driven by the linkage plate 52. The adapter sleeve 5312 is fixed at the disk gear 5311 and fitted to secure the drive rod 532. The drive rod 532 is fixed at the gear seat 531, used for driving the lock core component 300. The gear seat return spring 6 is disposed between the base 1 and the gear seat 531.

In the forbidden opening status, the electromagnet component 31 of the electromagnetic traction mechanism 3 makes the lever 21 to keep the stopper 22 in the stop position SP. At this time, the contact surface CS of the stopper 22 contacts the linkage plate 52 and blocks the linkage plate 52 from a locking position LP along a linkage path GP (marked in FIG. 7) to move to an unlocking position ULP (marked in FIG. 7). At this time, the gear seat 531 of the second drive component 53 is located in an initial position IP and prohibits the drive rod 532 from driving the lock core component 300, and causes the lock core component 300 to maintain a forbidden opening status so that the deadbolt 400 is kept snapping into the locking groove LG.

Figure 5:
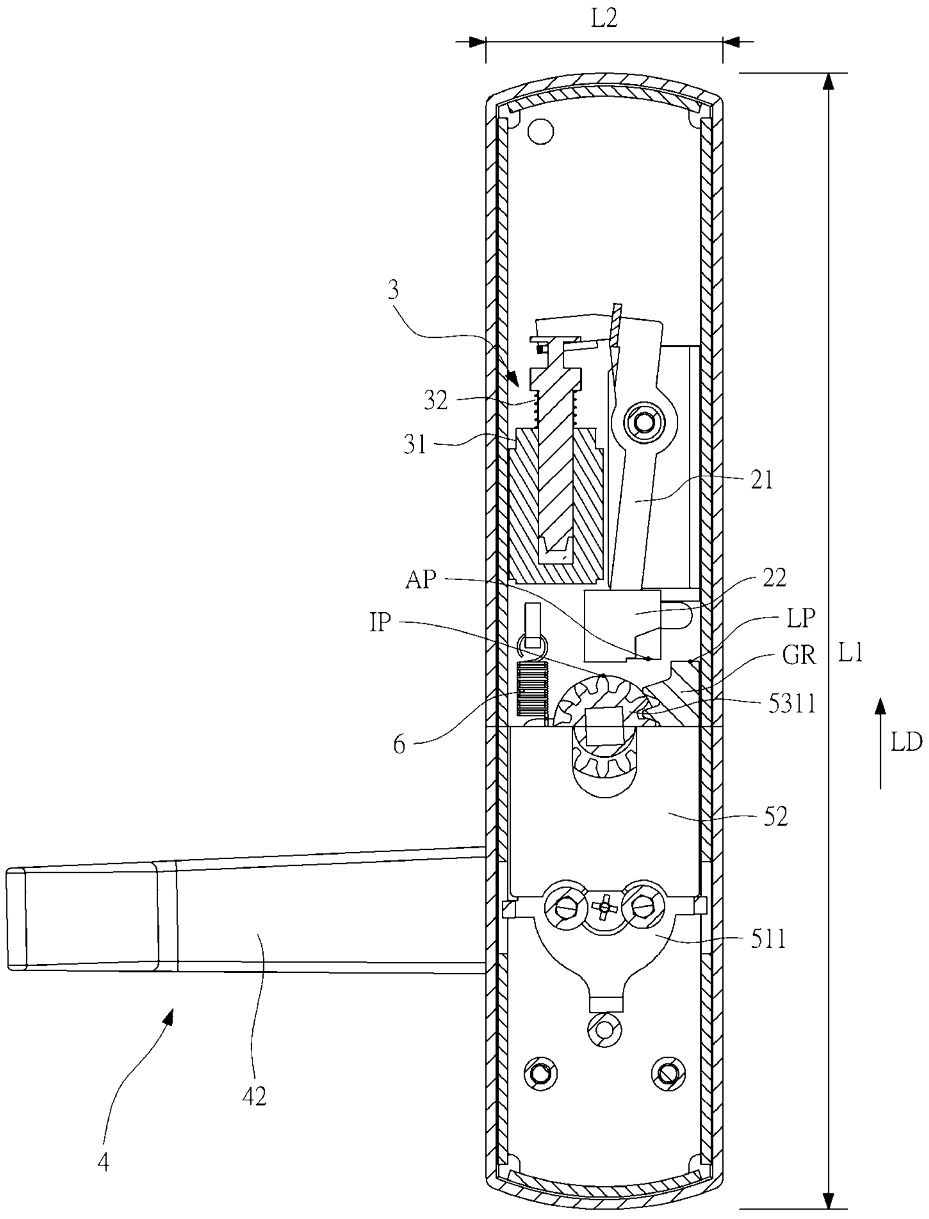
FIG. 5 is a schematic diagram showing the positional relationship of partial components of the narrow-type door-lock driving device with electronically controlled switching status in the allowing opening status of the first embodiment of the present invention.
Figure 6:
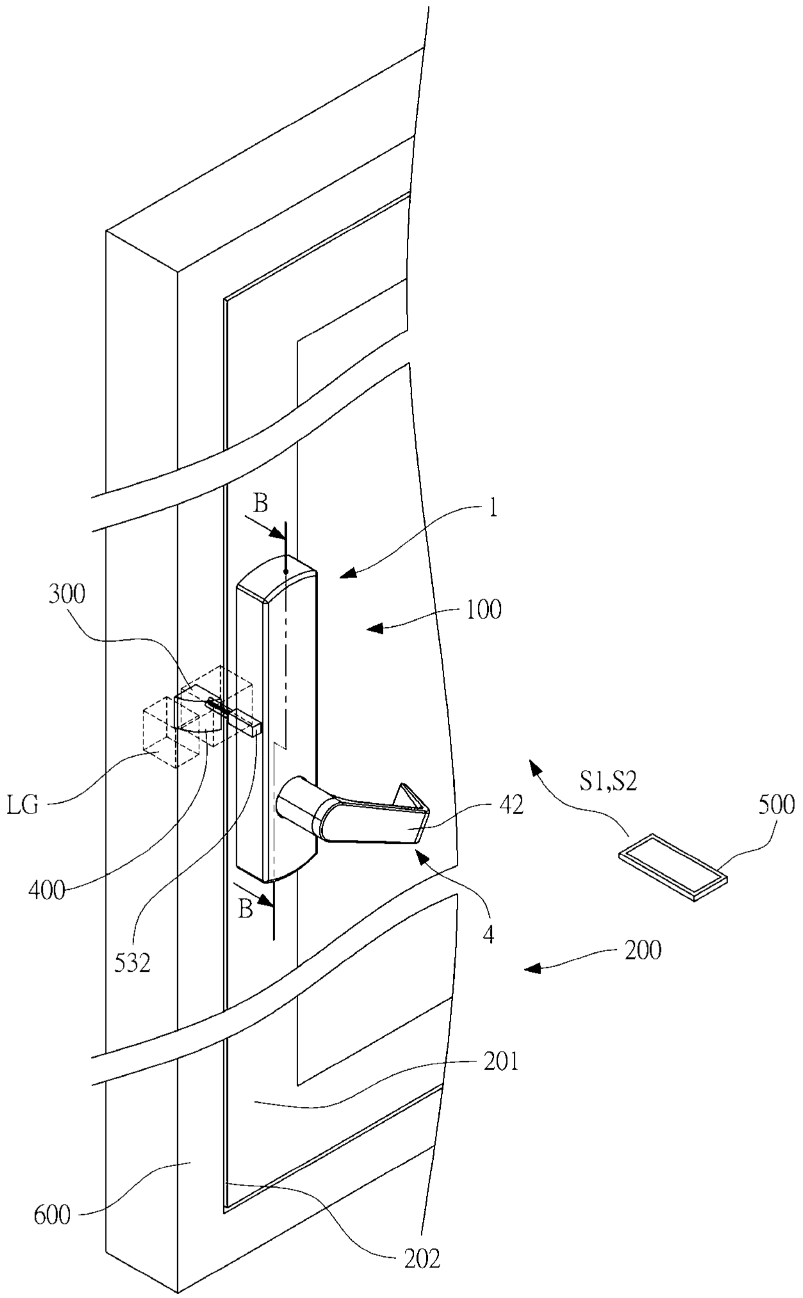
FIG. 6 is a schematic diagram showing the narrow-type door-lock driving device with electronically controlled switching status of the first embodiment of the present invention after being assembled on the sectional door and being operated to unlock the door.
Figure 7:
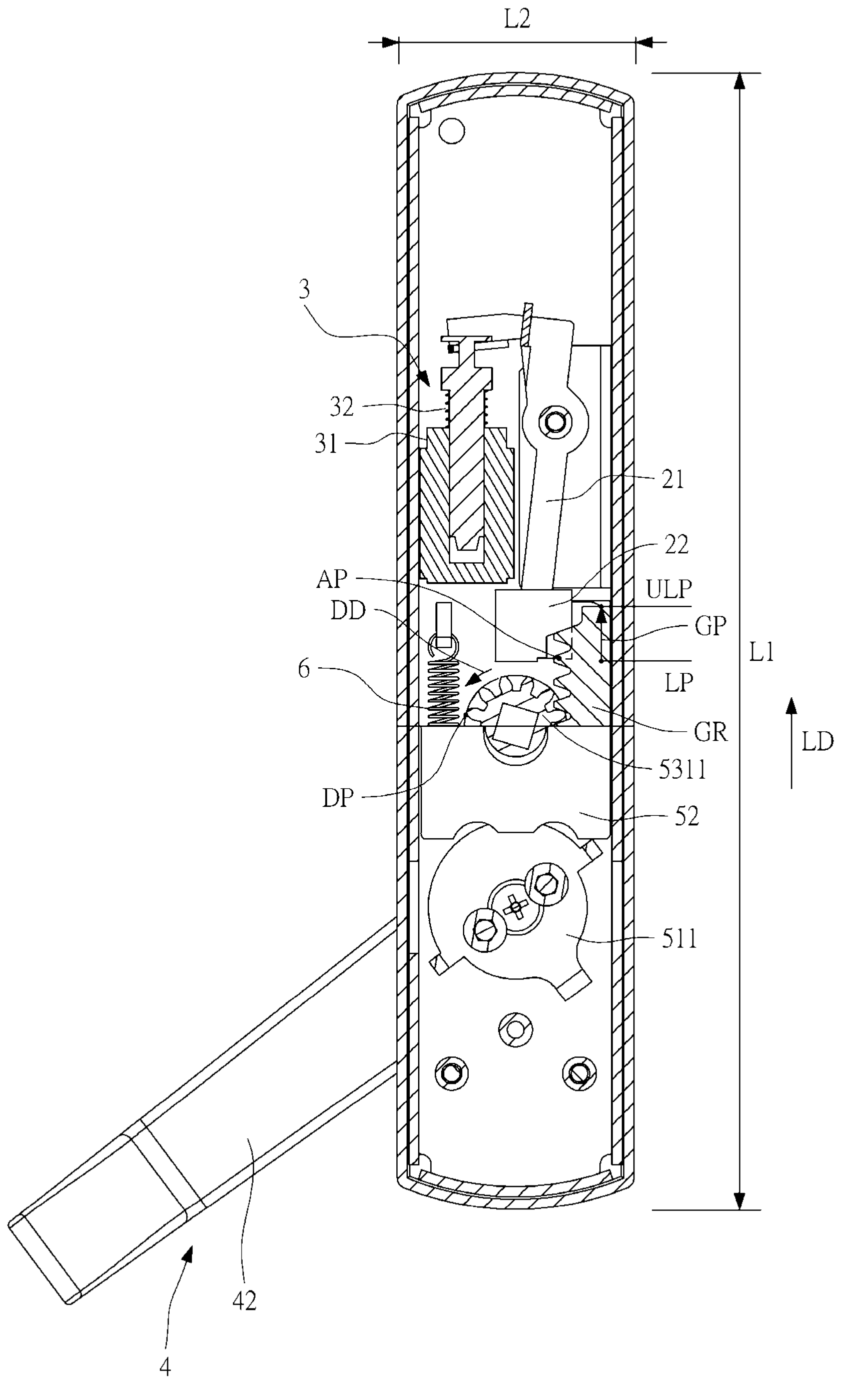
FIG. 7 shows a cross-sectional view of the narrow-type door-lock driving device with electronically controlled switching status in FIG. 6 along the B-B perspective.

Referring now to FIG. 5 to FIG. 7; where FIG. 5 is a schematic diagram showing the positional relationship of partial components of the narrow-type door-lock driving device with electronically controlled switching status in the allowing opening status of the first embodiment of the present invention, FIG. 6 is a schematic diagram showing the narrow-type door-lock driving device with electronically controlled switching status of the first embodiment of the present invention after being assembled on the sectional door and being operated to unlock the door, and FIG. 7 shows a cross-sectional view of the narrow-type door-lock driving device with electronically controlled switching status in FIG. 6 along the B-B perspective. Please also refer to FIG. 1 to FIG. 4.

As shown in FIG. 5 to FIG. 7, when the door-lock driving device 100 is in the forbidden opening status and after a control device 500 is operated by the user to send a first control signal S1 to the electromagnet component 31, the electromagnet component 31 drags the lever 21 to move the stopper 22 from the stop position SP (as shown in FIG. 4) to the avoidance position AP and transforms the door-lock driving device 100 into the allowing opening status. The avoidance position AP is to avoid the linkage path GP to allow the linkage plate 52 to move from the locking position LP along the linkage path GP to the unlocking position ULP.

In the allowing opening status, when the operation portion 42 of the handle 4 receives an unlocking operating force exerted by the user and is pressed down to operate, the handle positioning plate 511 of the first drive component 51 rotates and pushes the linkage plate 52 in conjunction, so that the linkage plate 52 moves along the linkage path GP. The gear seat 531 of the second drive component 53 is driven to rotate from the initial position IP (as shown in FIG. 4) to a driving position DP along a driving direction DD through the tooth row GR of the linkage plate 52. When the gear seat 531 is driven to rotate to the driving position DP, the drive rod 532 drives the lock core component 300, so that the lock core component 300 drives the deadbolt 400 to snap out of the locking groove LG and transform from the forbidden opening status to the allowing opening status.

After the door-lock driving device 100 changes from the forbidden opening status to the allowing opening status and the unlocking operating force is removed, the electromagnet return spring 32 provides a return force to move the lever 21, thereby moving the stopper 22 from the avoidance position AP to the stop position SP. The gear seat return spring 6 provides a rotational return force to rotate the gear seat 531 from the driving position DP back to the initial position IP.

Figure 8:
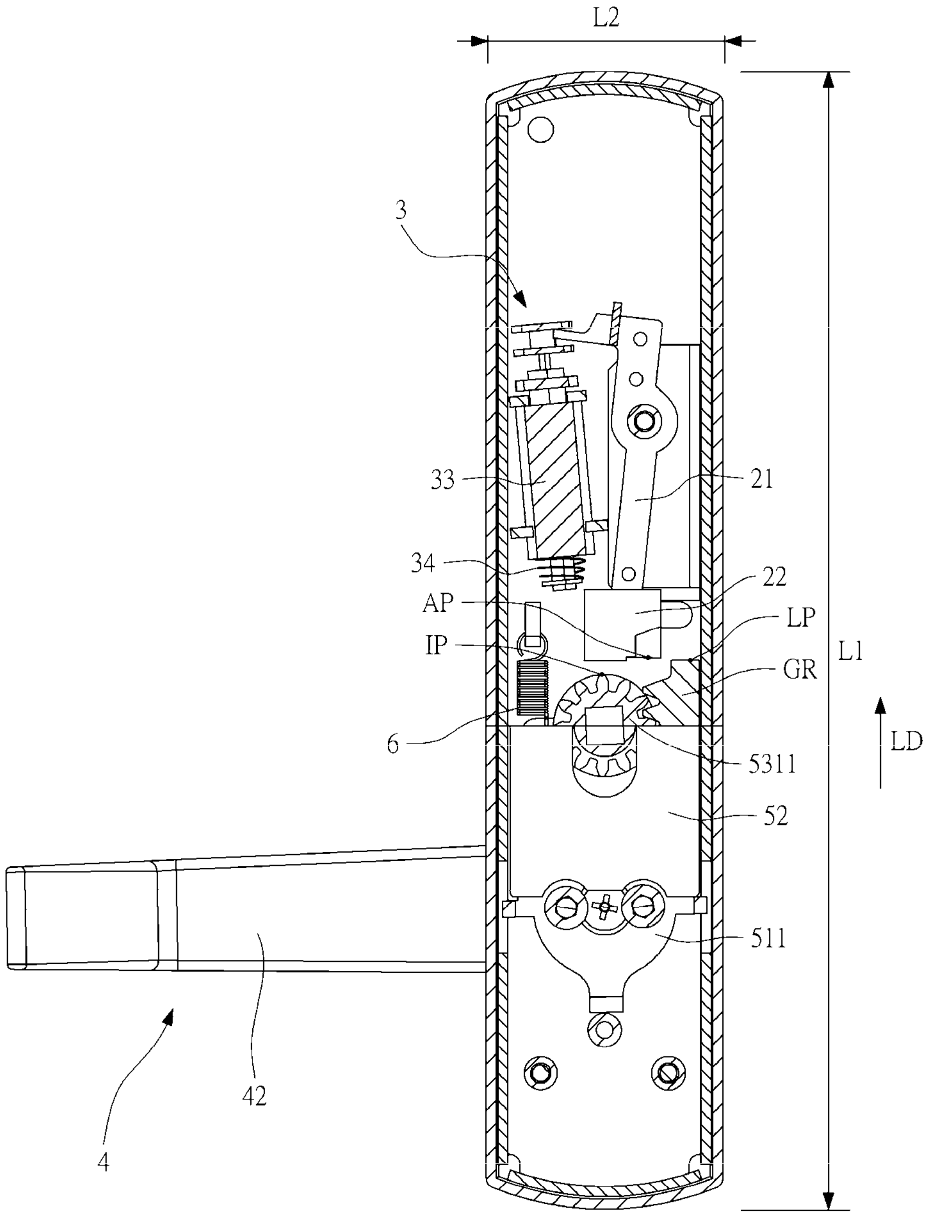
FIG. 8 is a schematic diagram showing the positional relationship of partial components of the narrow-type door-lock driving device with electronically controlled switching status in the allowing opening status of a second embodiment of the present invention.
Figure 9:
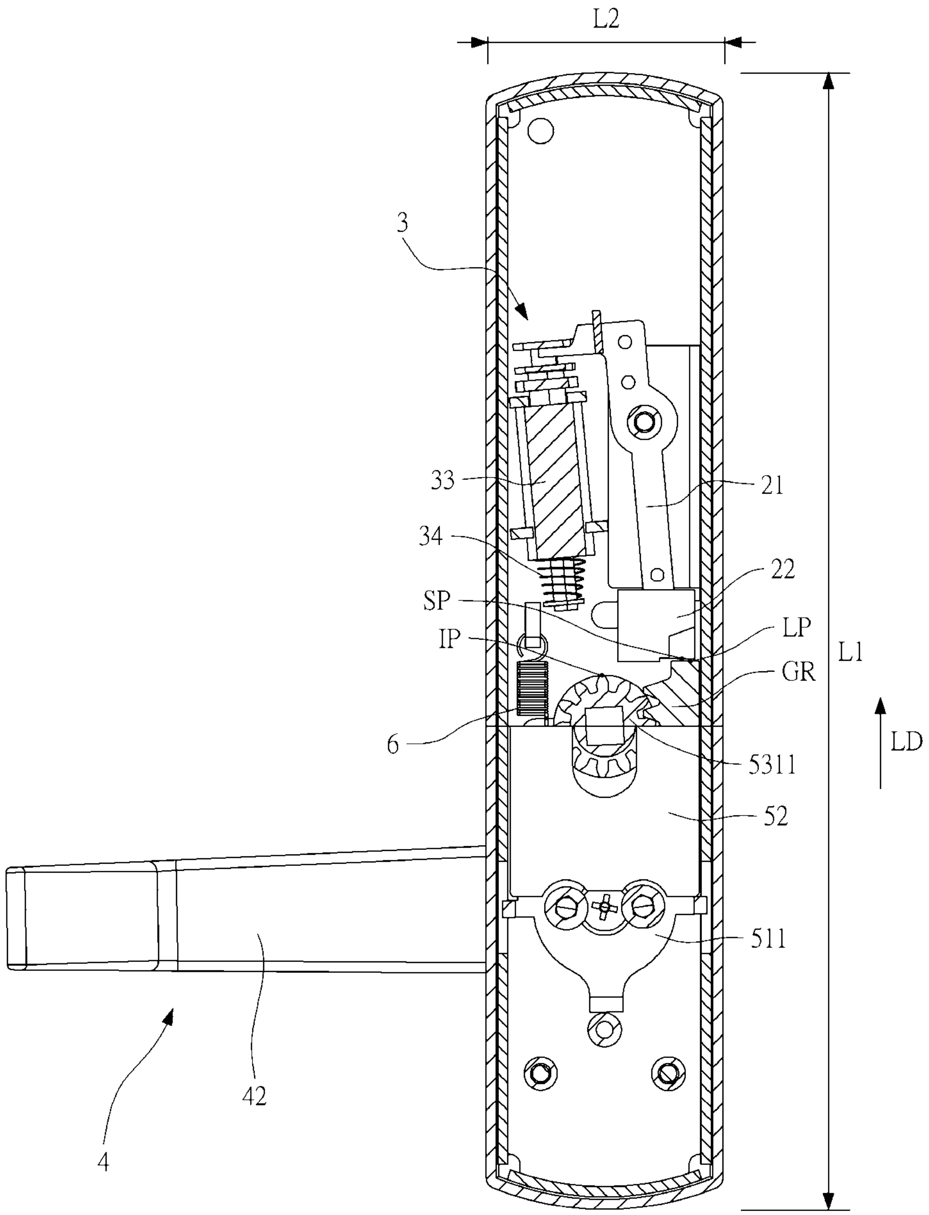
FIG. 9 is a schematic diagram showing the positional relationship of partial components of the narrow-type door-lock driving device with electronically controlled switching status in the forbidden opening status of the second embodiment of the present invention.

Referring now to FIG. 8 to FIG. 9; where FIG. 8 is a schematic diagram showing the positional relationship of partial components of the narrow-type door-lock driving device with electronically controlled switching status in the allowing opening status of a second embodiment of the present invention, and FIG. 9 is a schematic diagram showing the positional relationship of partial components of the narrow-type door-lock driving device with electronically controlled switching status in the forbidden opening status of the second embodiment of the present invention. Please also refer to FIG. 1 to FIG. 7.

As shown in FIG. 8 to FIG. 9, the electromagnetic traction mechanism 3 connects with the lever 21, including a solenoid valve component 33 and a solenoid valve return spring 34 in the second embodiment. The only difference between the present embodiment and the first embodiment is the electromagnetic traction mechanism 3, and the installation positions and the working principles of the door-lock driving device 100, the base 1, the status switching mechanism 2, the handle 4, the lock core driving mechanism 5 and the gear seat return spring 6 are similar or identical to those described in the first embodiment. Please refer to FIG. 1 to FIG. 7 and the descriptions in the above corresponding paragraphs. The solenoid valve component 33 is disposed at the base 1 and connects with the control device 500 in telecommunication for providing an electromagnetic force to drag the lever 21 to move. In the second embodiment, the solenoid valve component 33 is a power-off/on solenoid valve component. The power-off/on solenoid valve component is usually used in the normally-closed door-locks. The normally-closed door-locks are prohibited from opening when the access control system cuts off the power supply. The structure and working principle of the power-off/on solenoid valve component are not the focus of the present invention, and no further details will be given in this embodiment. The solenoid valve return spring 34 is disposed between the solenoid valve component 33 and the lever 21, used for providing a return force to move the lever 21 when the allowing opening status changes to the forbidden opening status, thereby moving the stopper 22 back from the stop position SP to the avoidance position AP.

Additionally, in order to prevent the user from misconnecting the power supply line of the power-off/on solenoid valve component, causing the power-off/on solenoid valve component to remain in the power-on status for a long time and causing the internal coil to exceed its operating temperature and burn out, a power-off/on electromagnet component can be installed in the normally-closed door-lock instead. Compared with the power-off/on solenoid valve component, the power-off/on electromagnet component can remain in the power-on status for a long time to prevent its internal coil from burning out. The structure and working principle of the power-off/on electromagnet component are not the focus of the present invention and will not be described again in this embodiment.

In the allowing opening status, the solenoid valve component 33 of the electromagnetic traction mechanism 3 makes the lever 21 to keep the stopper 22 in the avoidance position AP and to avoid the linkage path GP (marked in FIG. 7). After the handle 4 is pressed down, the linkage plate 52 is allowed to move from the locking position LP along the linkage path GP to the unlocking position ULP, thereby allowing the lock core component 300 to be driven by the drive rod 532 to drive the deadbolt 400 to snap out of the locking groove LG and transforming the forbidden opening status to the allowing opening status.

When the door-lock driving device 100 is in the allowing opening status and after the control device 500 is operated by the user to send a second control signal S2 to the solenoid valve component 33, the solenoid valve component 33 drags the lever 21 to move the stopper 22 from the avoidance position AP to the stop position SP and transforms the door-lock driving device 100 into the forbidden opening status.

In the forbidden opening status, when the operation portion 42 of the handle 4 receives an unlocking operating force exerted by the user and is pressed down to operate, the handle positioning plate 511 of the first drive component 51 rotates and pushes the linkage plate 52 in conjunction. Since the stopper 22 is located at the stop position SP and the contact surface CS is in contact with the linkage plate 52, the linkage plate 52 is prohibited from moving along the linkage path GP, so that the lock core component 300 maintains the forbidden opening status and the deadbolt 400 keeps snapping in the locking groove LG.

In summary, in the door-lock driving device 100 provided by the present invention, it uses all components related to the means (including a status switching mechanism 2, an electromagnetic traction mechanism 3, a lock core driving mechanism 5 and a gear seat return spring 6) that drive the lock core component 300 to be sequentially arranged in the base 1 along the longitude direction LD, so the power related to driving the door-lock can be transmitted upwards along the longitude direction LD from the handle 4 to form a power transmission chain, thereby allowing the door-lock driving device 100 to be installed on the narrow-type door-frame 201.

Additionally, by selectively replacing the electromagnet component 31 and the electromagnet return spring 32 with the solenoid valve component 33 and the solenoid valve return spring 34, the effect of replacing the normally-open access door with the normally-closed access door is achieved.

While the present invention has been particularly shown and described with reference to a preferred embodiment, it will be understood by those skilled in the art that various changes in form and detail may be without departing from the spirit and scope of the present invention.

What is claimed is:

1. A narrow-type door-lock driving device with electronically controlled switching status, disposed at a narrow-type door-frame of a sectional door board, the sectional door board including a locking side neighboring to a locking groove, the narrow-type door-lock driving device with electronically controlled switching status being used for driving a lock core component disposed inside the sectional door board to drive a deadbolt to snap into or out of the locking groove, the narrow-type door-lock driving device with electronically controlled switching status comprising:

a base, disposed neighboring to the locking side of the sectional door board;

a status switching mechanism, disposed at the base, including:

a lever, pivoted to the base; and a stopper, moved by the lever to move between a stop position and an avoidance position;

an electromagnetic traction mechanism, connected with the lever, used for keeping the stopper in the stop position when the lever is in a forbidden opening status, thereby after receiving a first control signal sent by a control device in the forbidden opening status, the electromagnetic traction mechanism drags the lever to move the stopper from the stop position to the avoidance position;

a handle, disposed at the base; and a lock core driving mechanism, connected with the handle and driven by the handle, disposed through the base and the sectional door board, wherein when the stopper is in the stop position, the lock core driving mechanism is blocked by the stopper and forbidden to be driven by the handle, the deadbolt kept snapping into the locking groove to maintain a forbidden opening status, wherein when the stopper is in the avoidance position, the lock core driving mechanism is driven by the handle to allow driving the lock core component, thereby allowing the deadbolt to snap out of the locking groove to turn to an allowing opening status;

wherein the electromagnetic traction mechanism makes the lever to keep the stopper in the avoidance position when the lever is in an allowing opening status.

2. The narrow-type door-lock driving device with electronically controlled switching status of claim 1, wherein the handle includes:

a drive portion, disposed inside the base; and an operation portion, extending out of the base from the drive portion, used for a user to operate and exert an unlocking operating force.

3. The narrow-type door-lock driving device with electronically controlled switching status of claim 2, wherein the lock core driving mechanism includes:

a first drive component, driven by the drive portion;

a linkage plate, driven by the first drive component to move along a linkage path, wherein when the stopper is in the stop position, the linkage plate is blocked by the stopper and forbidden to move along the linkage path; and a second drive component, driven by the linkage plate to drive the lock core component, wherein when the linkage plate is forbidden to move along the linkage path, the second drive component is forbidden to drive the lock core component.

4. The narrow-type door-lock driving device with electronically controlled switching status of claim 3, wherein the first drive component includes a handle positioning plate linked to the drive portion.

5. The narrow-type door-lock driving device with electronically controlled switching status of claim 3, wherein the linkage plate includes a gear row, the second drive component including:

a gear seat, engaged with the gear row, driven by the linkage plate, the gear seat rotating from an initial position to a driving position when the user exerts the unlocking operating force; and a drive rod, fixed at the gear seat, used for driving the lock core component.

6. The narrow-type door-lock driving device with electronically controlled switching status of claim 5, wherein the gear seat includes:

a disk gear, engaged with the gear row for being driven by the linkage plate; and an adapter sleeve, fixed at the disk gear and fitted to secure the drive rod.

7. The narrow-type door-lock driving device with electronically controlled switching status of claim 5, further including a gear seat return spring, disposed between the base and the gear seat, rotating from the driving position back to the initial position when the unlocking operating force is removed.

8. The narrow-type door-lock driving device with electronically controlled switching status of claim 1, wherein the electromagnetic traction mechanism includes:

an electromagnet component, disposed at the base, wherein when the lever is in the forbidden opening position, the electromagnet component drives the lever to keep the stopper in the stop position, wherein after receiving the first control signal sent by the control device, the electromagnet component drives the lever to move the stopper from the stop position to the avoidance position; and an electromagnet return spring, disposed between the electromagnet component and the lever, used for providing a return force to move the lever to move the stopper back from the avoidance position to the stop position when the forbidden opening status changes to the allowing opening status.

9. The narrow-type door-lock driving device with electronically controlled switching status of claim 1, wherein the electromagnetic traction mechanism includes:

a solenoid valve component, disposed at the base, wherein when the lever is in the allowing opening status, the solenoid valve component drives the lever to keep the stopper in the avoidance position, wherein after receiving a second control signal sent by the control device, the solenoid valve component drags the lever to move the stopper from the avoidance position to the stop position; and a solenoid valve return spring, disposed between the solenoid valve component and the lever, used for providing a return force to move the lever to move the stopper back from the stop position to the avoidance position when the allowing opening status changes to the forbidden opening status.

* * * * *